Dec. 28, 1954   B. PELLATON   2,697,883
APPARATUS FOR LEARNING TO DRIVE MOTOR CARS
Filed Aug. 28, 1952   2 Sheets-Sheet 1

INVENTOR:

Benjamin Pellaton

By Haseltine, Lake & Co.
AGENTS

Dec. 28, 1954   B. PELLATON   2,697,883
APPARATUS FOR LEARNING TO DRIVE MOTOR CARS
Filed Aug. 28, 1952   2 Sheets-Sheet 2

INVENTOR:
Benjamin Pellaton
By:
Haseltine, Lake & Co.
AGENTS

United States Patent Office

2,697,883
Patented Dec. 28, 1954

2,697,883

APPARATUS FOR LEARNING TO DRIVE MOTORCARS

Benjamin Pellaton, Biel, Switzerland, assignor to Etablissements Pateco, Vaduz, Liechtenstein Application August 28, 1952, Serial No. 306,849

Claims priority, application Switzerland September 3, 1951

7 Claims. (Cl. 35—11)

This invention relates to apparatus for learning to drive motor cars. According to the invention a plate representing the road or street is movably arranged with respect to a stationary car-model and is coupled with driving members by means of which both a straight and an arcuate movement may be imparted to said plate. By means of this apparatus the steering or driving of a car may be learned in a room. Furthermore the auxiliary device may be employed for demonstrating purposes in order to teach pedestrians, and thus it may contribute to prevent traffic accidents.

The present invention will now be described more fully with reference to the accompanying drawings illustrating, by way of example, a preferred embodiment of the invention, and in which.

Figure 1:
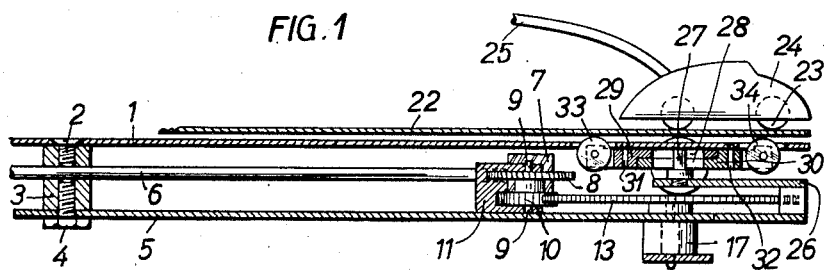
Fig. 1 is a vertical section through the apparatus on the line I—I in Fig. 3.
Figure 2:
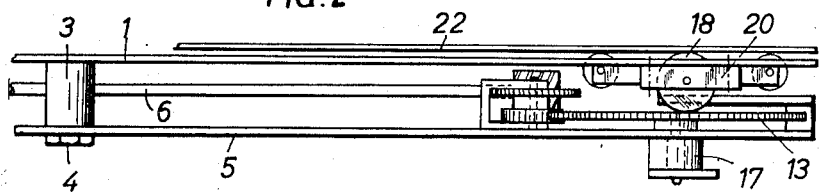
Fig. 2 is a side elevation of the apparatus.

Referring to the drawings, a base plate 1 carries on its underside a rotatable pivot 3 held by means of a screw 2. A swing-plate 5 is secured to the pivot 3 by means of a screw 4; this plate 5 is connected with a steering wheel 43 (Fig. 6) in a manner to be described later, and so that in turning the steering wheel to the left side the plate 5 is swung to the left side and upon turning the steering wheel to the right side said plate is correspondingly swung to the right. A drive shaft 6, passing through a bore of the pivot 3 carries at its free end a worm 7 engaging a worm wheel 8. A toothed spur wheel 10, moreover, is mounted on the shaft 9 of the worm wheel 8. The two shafts 6 and 9 are journalled in a bearing block 11, which is secured to the swing-plate 5 by means of the screws 12. The spur wheel 10 meshes with another spur wheel 13, which in turn meshes with a spur wheel 14. The shafts 15 and 16 of these two spur gears 13, 14 are journalled in the swing-plate 5 and in a cross-piece 17 attached underneath of the plate 5. The upper faces of the gears 13, 14 are flat and against each of them a friction disc 18 and 19, respectively, bears. These two friction discs 18, 19 are of rubber or provided with rubber on their respective circumference and they are journalled each in a bearing block 20 and 21, respectively, screwed to the base plate 1. The friction discs 18, 19 moreover bear against the underside of a plate 22 and they serve for moving this plate which forms the road for a car model 24. The wheels 23 of the car-model 24 rest on the top face of the road plate 22, while the car model is secured to the base plate 1 by means of a flexible rod 25.

An inwardly bent extension 26 is attached to the swing-plate 5, on which extension a pin 27 is mounted, engaging the longitudinal slots 28 of two arms 29, 30, which are pivotally mounted on pins 31, 32 respectively, secured to the base plate 1 and which carry at their free end each a guiding roller 33 and 34, respectively. These rollers 33, 34 similar to the friction discs 18, 19 are provided with rubber along their circumference and they also bear against the underside of the road-plate 22, which thus is held between the friction discs 18, 19 and the guiding rollers 33, 34 on the one side and the wheels 23 of the car-model 24 on the other side.

Figure 3:
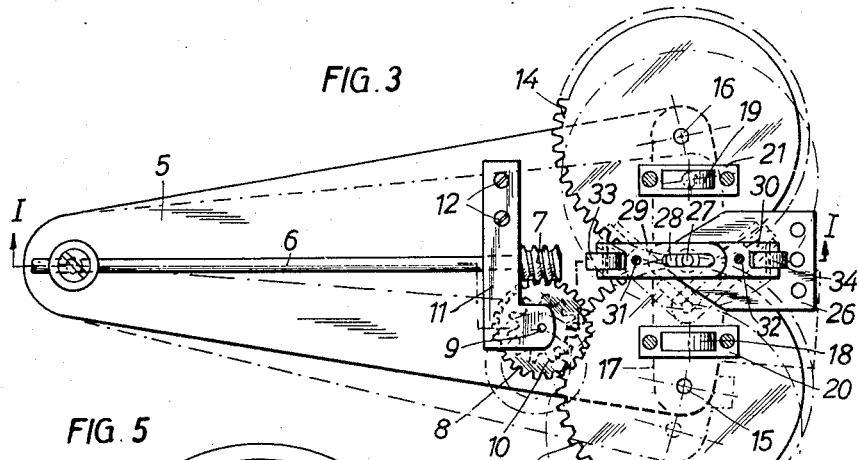
Fig. 3 is a plan view of the apparatus but without road-plate and base plate.

In the position of the swing-plate 5, shown in Fig. 3 with full lines, the two friction discs 18, 19 are at equal distance from the axes of rotation 15, 16 of the spur gears 13, 14 and therefore are driven in the same direction of rotation and at the same speed. Furthermore, the two arms 29, 30 are in line with each other, so that the axes of rotation of the guiding rollers 33, 34 are parallel to the corresponding axes of the friction discs 18, 19. It may be easily realized from Fig. 3, that in this position of the swing-plate 5, the friction discs 18, 19, upon rotation of the gear wheels 13, 14, act on the road plate 22 to move this plate owing to friction in a straight line.

Figure 4:
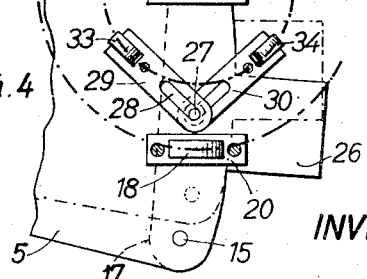
Fig. 4 is a partial plan view similar to Fig. 3 with the swing-plate moved sidewards.

When the swing-plate 5 is angularly moved on its pivot 3 out of its middle position by turning the steering wheel 43, the spur gears 13, 14 journalled in the plate 5 are moving along with the plate and the friction discs 18, 19 change their respective distance from the axes of rotation 15, 16 of the spur gears 13, 14, and in doing so are driven at different speeds. In the position of the swing-plate 5 as illustrated in Fig. 4 the friction disc 19, for instance, is situated just above the axis of rotation 16 of the spur gear 14 and consequently is not driven. On the other hand, the friction disc 18 is located at a greater distance from the axis of rotation 15 than in the middle position of the swing-plate 5 (according to Fig. 3), so that the disc 18 is driven at a faster speed. Furthermore, in the position according to Fig. 4, the arms 29, 30 due to the co-operation of the pin 27 with the longitudinal slots 28, have been swung in such a manner, that they include an angle and that the guiding rollers occupy an oblique position. Accordingly in this position of the swing-plate 5, the road-plate 22 is moved so that it turns around a point coinciding with the axis 16 as indicated by the dot and dash-lines in Fig. 4. The size of the circular arcs depends in this case on the amount of the angular displacement of the swing-plate 5 and thus may be adjusted by means of the steering wheel 43. When swinging the plate 5 towards the other side, the road-plate 22, as evident, is turned in opposite direction.

Figure 5:
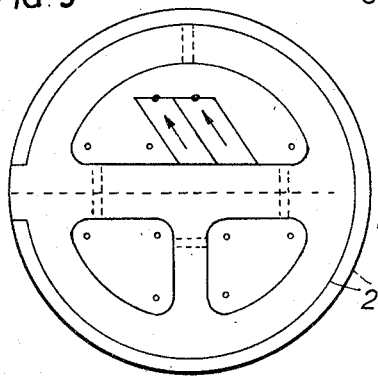
Fig. 5 is a plan view of the road-plate.

On the top surface of the road-plate 22, as illustrated in Fig. 5, a road system consisting of straight and curved street lengths, of street crossings and parking spaces, is represented and the road plate 22 must now be moved as if the car model were running on the streets.

Figure 6:
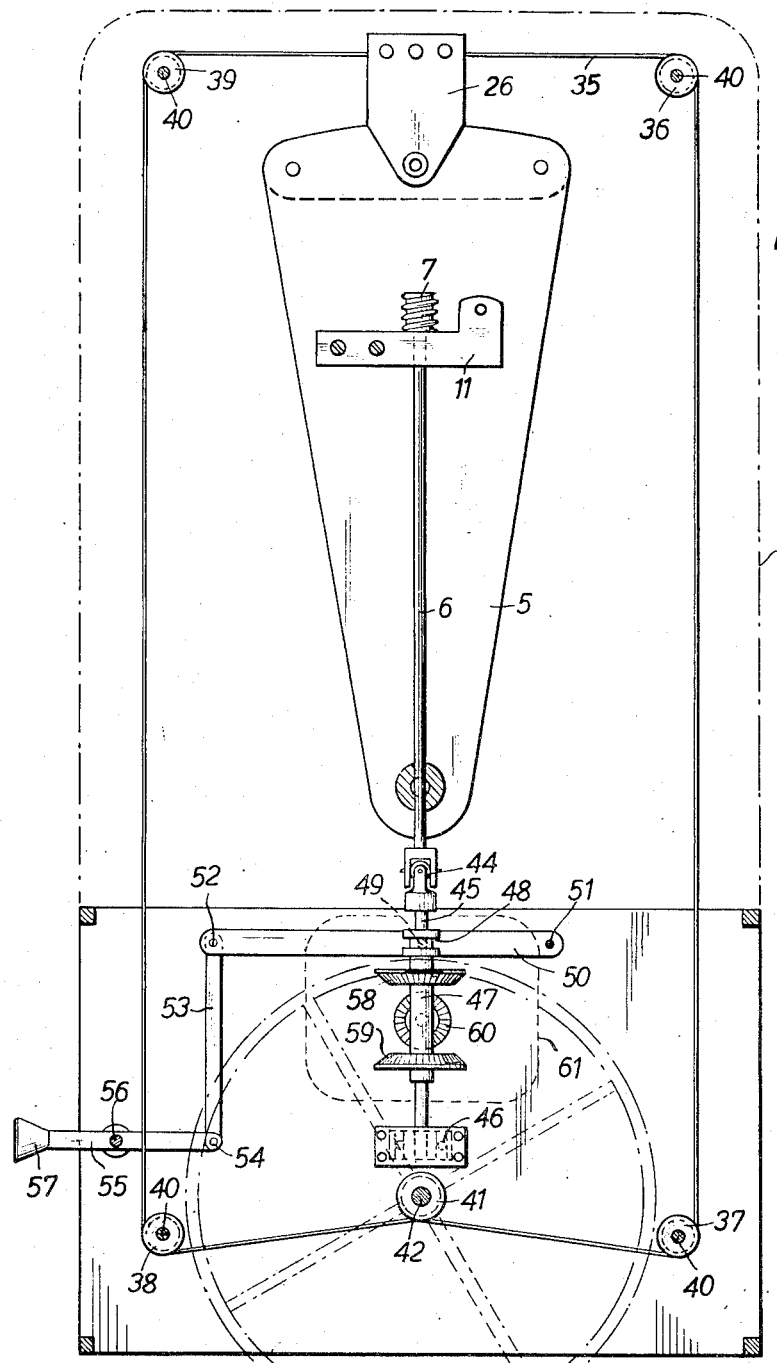
Fig. 6 is a plan view particularly representing the driving mechanism of the apparatus.

As shown in Fig. 6, a cable 35 is attached to the extension 26 of the swing plate 5. The cable passes over rollers 36, 37, 38 and 39, mounted by means of axes 40 on the base plate 1. A drive roller 41 is secured to the shaft 42 of the steering wheel 43. Upon rotation of the steering wheel in one or the other direction, the swing plate 5 is correspondingly turned about the pivot 3, and the road plate 22, as already stated, is turned according to the amount of rotation of the steering wheel along an arc of smaller or greater radius when the gear wheels 13 and 14 turn.

As further shown in Fig. 6, the drive shaft 6 is coupled to a shaft 45 by means of an universal joint 44. The shaft 45 has its free end mounted in a ball bearing 46. A sleeve 47 is mounted on the shaft 45 to turn with the shaft and to slide longitudinally relatively to the shaft. The sleeve 47 is provided with an annular groove 48 into which penetrates a pin 49 carried by a lever arm 50. This arm is hingedly mounted with one end at 51 on the base plate 1, and with the other end connected to a link 53 by means of a pin 52, while the link is connected at 54 to a lever 55 pivotally mounted at 56 and provided with a handle 57. The sleeve 47 carries two bevel gear wheels 58, 59 which can selectively mesh with a bevel gear 60 when the sleeve is axially moved by actuation of the lever 55 to move the lever 50 carrying the annular groove engaging pin 49. The bevel gear wheel 60 is driven by means of a motor 61. When engaging one or the other of the two bevel wheels 58, 59 with the wheel 60, the shaft 45, and accordingly the shaft 6 may be rotated in one or the other direction, and the movement of rotation is transmitted by the worm 7, worm wheel 8 and wheel 9 to the gear wheels 13 and 14. The motor 61 will preferably be of variable speed.

I claim:

1. Miniature apparatus for learning to drive motor cars, comprising a stationary miniature car model, having rotatable wheels, a road representing plate beneath the stationary car model, guiding rollers and friction discs bearing against the underside of the road representing plate which thereby is held movably between said wheels of the stationary miniature car model and said guiding rollers and friction discs, driving means operatively connected to said friction discs, and control means operative to simultaneously change the relative speeds of the friction discs and the relative positions of the guiding rollers so that the road representing plate can be moved both rectilinearly and arcuately so that the stationary miniature car model follows straight and curved road representations on the road representing plate.

2. Miniature apparatus for learning to drive motor cars, comprising a stationary miniature car model, having rotatable wheels, a road representing plate beneath the stationary car model, guiding rollers and friction discs bearing against the underside of the road representing plate which thereby is held movably between said wheels of the stationary miniature car model and said guiding rollers and friction discs, said guiding rollers and friction discs being spaced apart in the longitudinal and transverse directions, respectively, of said car model, driving means operatively connected to said friction discs, and driving means including two rotatable driving discs each having one face thereof in frictional engagement with a related one of said friction discs to impart rotation to the friction discs upon rotation of the driving discs, said driving discs being movable together transversely to their axes of rotation and relative to the friction discs to vary the radial distance of the friction discs from axes of rotation of the driving discs in order to permit the driving of the friction discs at relatively different speeds, whereby the road representing plate can be moved both rectilinearly and arcuately so that the stationary miniature car model follows straight and curved road representations on the road representing plate.

3. Miniature apparatus for learning to drive motor cars, comprising a stationary miniature car model having rotatable wheels, a road representing plate beneath the stationary car model, guiding rollers and friction discs bearing against the underside of the road representing plate which thereby is held movably between said wheels of the stationary miniature car model and said guiding rollers and friction discs, said guiding rollers and said friction discs being respectively spaced apart in the longitudinal and transverse directions of said car model, driving means operatively connected to said friction discs, said driving means including two rotatable driving discs each having a face thereof in frictional engagement with a related one of said friction discs to impart rotation to the friction discs upon rotation of the driving discs, an angularly movable swing-plate carrying said driving discs for moving them together transversely to their axes of rotation and relative to the friction discs to vary the radial distance of the friction discs from the axes of rotation of the driving discs in order to permit the driving of the friction discs at relatively different speeds, and means operative to angularly displace said guiding rollers with respect to each other in response to angular movement of said swing-plate whereby said road representing plate can be moved both rectilinearly and arcuately to cause said stationary car model to follow straight and curved road representations on said road representing plate.

4. Miniature apparatus for learning to drive motor cars, comprising a stationary miniature car model having rotatable wheels, a road representing plate beneath the stationary car model, guiding rollers and friction discs bearing against the underside of the road representing plate which thereby is held movable between the wheels of the stationary miniature car model and said guiding rollers and friction discs, driving means operatively connected to said friction discs, and said driving means including two rotatable driving discs each having one face thereof in frictional engagement with a related one of said friction discs to impart rotation to the friction discs upon rotation of the driving discs, an angularly movable swing-plate carrying said driving discs for moving the latter together transversely to their axes of rotation and relative to the friction discs to vary the radial distance of the friction discs from the axes of rotation of the driving discs in order to permit the driving of the friction discs at relatively different speed, said guiding rollers being carried by pivotally mounted arms each provided with a slot into which a pin on the swing-plate engages so that said arms may be pivoted from a middle position, where they are in alignment with each other to positions where they are angularly disposed with respect to each other, whereby the road representing plate can be moved both rectilinearly and arcuately so that the stationary miniature car model follows straight and curved road representations on the road representing plate.

5. Miniature apparatus according to claim 4; further comprising a base plate disposed between said road representing plate and said swing-plate, said base plate having slots therein and through which said friction discs and guiding rollers extend to act against the underside of said road representing plate.

6. Miniature apparatus according to claim 5; further comprising a flexible rod extending from said base plate to said car model to hold the latter stationary in a selected position.

7. Miniature apparatus for simulating the driving of a motor car; said apparatus comprising a stationary miniature car model having rotatable wheels, a road representing plate beneath the stationary car model, guiding rollers and friction discs bearing against the underside of said plate so that the latter is movably held between said wheels and said guiding rollers and friction discs, said guiding rollers and said friction discs being respectively spaced apart in the longitudinal and transverse directions of said car model, driving means for said friction discs including two rotated driving discs each in frictional engagement with a related one of said friction discs, means operative to displace said driving discs together in the traverse direction of said car model thereby to vary the distances between said friction discs and the axes of rotation of said driving discs for altering the relative rotational speeds of said friction discs, and means angularly displacing said guiding rollers relative to each other in response to transverse displacement of said driving discs whereby said road representing plate can be displaced along rectilinear and arcuate paths relative to cause the latter to follow straight and curved road representations on said plate.

References Cited in the file of this patent

UNITED STATES PATENTS

| Number | Name | Date |
|---|---|---|
| 2,046,202 | Miles | June 30, 1936 |
| 2,289,877 | Dreyer | July 14, 1942 |
| 2,452,039 | Crane | Oct. 26, 1948 |
| 2,459,150 | Crane et al. | Jan. 18, 1949 |
| 2,528,502 | De Florez et al. | Nov. 7, 1950 |
| 2,579,177 | Miles | Dec. 18, 1951 |
| 2,623,302 | Shields | Dec. 30, 1952 |